United States Patent [19]

Bleakley

[11] Patent Number: 6,004,467

[45] Date of Patent: *Dec. 21, 1999

[54] PROCESS FOR THE TREATMENT OF AN AQUEOUS SUSPENSION COMPRISING KAOLIN

[75] Inventor: Ian Stuart Bleakley, St. Austell, United Kingdom

[73] Assignee: ECC International Ltd., Berkshire, United Kingdom

[*] Notice: This patent is subject to a terminal disclaimer.

[21] Appl. No.: 09/184,390

[22] Filed: Nov. 2, 1998

Related U.S. Application Data

[63] Continuation-in-part of application No. 08/800,849, Feb. 14, 1997, Pat. No. 5,830,364, which is a continuation-in-part of application No. 08/521,010, Aug. 30, 1995, abandoned, which is a continuation of application No. 08/171,018, Dec. 21, 1993, abandoned.

[30] Foreign Application Priority Data

Dec. 23, 1992 [EP] European Pat. Off. ............. 92311774

[51] Int. Cl.$^6$ ..................................... C02F 1/52
[52] U.S. Cl. ........................... 210/717; 162/29; 162/189; 210/726; 210/928; 501/147
[58] Field of Search ............................. 162/29, 189, 190; 210/702, 712, 710, 711, 716, 717, 724, 726, 737, 917, 928; 501/145–148

[56] References Cited

U.S. PATENT DOCUMENTS

| | | | |
|---|---|---|---|
| 2,470,577 | 5/1949 | Roderick et al. | 106/306 |
| 2,941,942 | 6/1960 | Dahlstrom et al. | 210/725 |
| 3,152,001 | 10/1964 | Podschus et al. | 106/306 |
| 3,262,877 | 7/1966 | Le Compte | 210/716 |
| 3,639,206 | 2/1972 | Spruill | 162/29 |
| 3,661,610 | 5/1972 | Ferris | 106/309 |
| 3,736,254 | 5/1973 | Croom | 210/928 |
| 3,833,463 | 9/1974 | Croom | 162/189 |
| 4,002,487 | 1/1977 | Conley | 106/309 |
| 4,017,391 | 4/1977 | Black | 210/705 |
| 4,076,620 | 2/1978 | Opferkuch et al. | 210/711 |
| 4,115,188 | 9/1978 | O'Brien et al. | 162/190 |
| 4,806,167 | 2/1989 | Raythatha | 106/465 |
| 5,082,887 | 1/1992 | Brown et al. | 524/413 |
| 5,262,006 | 11/1993 | Anderrson et al. | 162/147 |
| 5,558,782 | 9/1996 | Bleakley et al. | 210/712 |
| 5,733,461 | 3/1998 | Bleakley | 210/712 |
| 5,830,364 | 11/1998 | Bleakley | 210/712 |

FOREIGN PATENT DOCUMENTS

| | | |
|---|---|---|
| 604095 | 6/1994 | European Pat. Off. . |
| 49-127466 | 4/1973 | Japan . |
| 48-37041 | 11/1973 | Japan . |
| 52-3509 | 1/1977 | Japan . |
| 54-35421 | 11/1979 | Japan . |
| 62-162098 | 7/1987 | Japan . |
| 62-60150 | 12/1987 | Japan . |
| 2013169 | 1/1978 | United Kingdom . |
| 2019370 | 10/1979 | United Kingdom . |
| 2265916 | 4/1993 | United Kingdom . |
| WO 79/00870 | 11/1979 | WIPO . |
| WO 87/00544 | 1/1987 | WIPO . |
| WO 88/02048 | 3/1988 | WIPO . |
| WO 90/09483 | 8/1990 | WIPO . |
| WO 96/28517 | 9/1996 | WIPO . |

OTHER PUBLICATIONS

Murray, H.H. (Ed.), 1996, TAPPI Monograph Series No. 30 "Paper Coating Pigments", pp. 34–35.

*Primary Examiner*—Peter A. Hruskoci
*Attorney, Agent, or Firm*—Klauber & Jackson

[57] ABSTRACT

There is disclosed a process for improving one or more properties of kaolin comprising:
(a) providing an aqueous suspension of particulate kaolin clay;
(b) introducing into the aqueous suspension a first reagent comprising a source of alkaline earth metal ions and a second reagent comprising a source of carbonate ions to precipitate an alkaline earth metal carbonate in the said aqueous suspension of the said particulate kaolin clay whereby the said particulate kaolin clay present at the start of the process becomes entrained by and bonded to the alkaline earth metal carbonate to form a composite particulate product which may be used in paper making or paper coating or as a filler or extender in compositions for other applications. The alkaline earth metal ions may be calcium ions provided by calcium hydroxide obtained by slaking lime either in the aqueous suspension or separately. The carbonate ions may be provided by carbon dioxide.

20 Claims, No Drawings

PROCESS FOR THE TREATMENT OF AN AQUEOUS SUSPENSION COMPRISING KAOLIN

CROSS-REFERENCE TO RELATED APPLICATIONS

This application is a continuation-in-part of pending application Ser. No. 08/800,849 filed Feb. 14, 1997 now U.S. Pat. No. 5,830,364 which is a continuation-in-part of application Ser. No. 08/521,010 filed Aug. 30, 1995 now abandoned, which is a continuation of application Ser. No. 08/171,018 filed Dec. 21, 1993 now abandoned.

BACKGROUND OF THE INVENTION

1. Field of the Invention

The present invention relates to the treatment of aqueous suspensions of particulate solid material which comprise kaolin. Additionally, the present invention relates to the recovery and use of solids-containing products produced by the process.

Many naturally occurring mineral materials are subjected to processing steps such as particle size reduction and separation in order to select those particles which have the most desirable distribution of sizes for a particular application. In many cases the natural mineral material or the material obtained by processing, eg grinding, contains a significant proportion of particles which are undesirable for the particular application for which the mineral material is being prepared, and it is necessary to remove these excessively fine particles. When the particle size separation is performed on a mineral material in suspension in a liquid, which would most commonly be water, and when the undesired fine particles have an equivalent spherical diameter of about 1 μm or less, especially 0.5 μm or less, the suspension of the undesired fine particles is often obtained in the form of a dilute suspension which is extremely difficult to dewater by conventional methods. It is generally unacceptable, for environmental reasons, to allow such dilute suspensions of fine mineral particles to be discharged to rivers or lakes, and, as a result, such unwanted suspensions of very fine particles are often retained in lagoons, thus occupying large areas of land which could more profitably be used for other purposes.

Kaolin is a particulate inorganic solid material which finds wide use as a pigment, filler, extender or the like in a variety of applications, eg paper filling and coatings, polymers, plastics, paints, sealants and the like. Kaolin is generally obtained from mineral sources and is treated by a series of processing steps which provide refinement to provide suitable product properties. The treatment may include particle size reduction and/or separation steps as referred to earlier. Such treatment has been practised industrially for many years.

One purpose of the present invention is to provide a method by which properties of a particulate kaolin product may be improved.

Another purpose of the present invention is to provide a method by which a suspension comprising very fine kaolin, separated from a main kaolin product by a particle size separation process, and hitherto regarded as a waste material, may be recovered and re-used.

The present invention, as described hereinafter, is concerned with forming an inorganic precipitate in an aqueous medium containing suspended kaolin particles from a kaolin processing operation, which in some instances may comprise kaolin particles previously regarded as waste because of their fine nature, and thereby forming a useful composite product with the kaolin which can be re-used for example in paper making. Such a process is not suggested in the prior art.

2. Summary of the Prior Art

A chemical process for dealing with the solid material in a paper plant effluent stream is described by O'Brien in U.S. Pat. No. 4,115,188. The solids present are coagulated and flocculated by changes in pH.

Formation of a precipitate in a waste aqueous medium is known per se. For example, such a process is described by Le Compte in U.S. Pat. No. 3,262,877, Spruill in U.S. Pat. No. 3,639,206 and Opferkuch in U.S. Pat. No. 4,076,620 but in these cases there is no disclosure or suggestion of precipitating specifically onto suspended particles and making use in paper making or other processes of the product formed. It is to be noted that Spruill uses lime to provide a flocculating effect on suspended solid material in an effluent stream from the pulping of wood. However, the suspended lime-treated solid material is separated by a clarification step. Although precipitation is subsequently carried out using addition of carbon dioxide the treated aqueous medium contains substantially no suspended solids when the precipitate is formed. Thus, no composite is formed as in the method of the present invention. The waste water which is produced in the various stages of the process described by Spruill is not suitable for treatment to recover a useful composite product therefrom because it is too dilute.

SUMMARY OF THE PRESENT INVENTION

The problem of improving the properties of kaolin in an aqueous suspension is solved in accordance with the present invention by synthesizing a useful precipitate in the suspension which bonds to and entrains the kaolin particles in a composite crystalline structure. The resultant composite may thereafter be supplied to a paper making or other process for use therein as a particulate pigment, filler, extender or the like.

The present invention is directed to a method for recovering or improving the properties of kaolin particles present in an aqueous suspension. The kaolin will constitute at least about 0.5% by weight of the suspension. The method comprises treating the aqueous suspension so as to precipitate, in the presence of the kaolin particles, crystals of an alkaline earth metal carbonate whereby the kaolin particles become entrained by, and bonded to, the crystals, thereby forming in the aqueous suspension a composite particulate solid comprising the kaolin and precipitate alkaline earth metal carbonate compound. The method may also include the step of recovering the composite particulate solid and supplying such solid for use as a particulate filler or pigment material in a filler- or pigment-containing composition.

The solids contained in the aqueous suspension to be treated may be formed of at least 95% by weight, desirably about 100% by weight, of particles which are substantially insoluble in water.

Desirably, the solids content of the aqueous suspension to be treated in step a) is at least 0.5% by weight, eg from 0.5% to 10% by weight, particularly from 1% to 5% by weight of the suspension. The solids content may increase substantially, eg by from 2% to 20% by weight, after formation of the precipitate and composite product, the final solids content depending upon the weight of precipitate produced. The weight ratio of particles originally present to precipitate crystals formed by the method may be in the range of from about 1:10 to about 10:1, especially from about 1:4 to about 4:1.

The said mixed composite particulate solid present in the said suspension after completion of the precipitation step a) may incorporate at least 95% by weight of, preferably substantially all of, the solids present in the suspension prior to the precipitation.

Desirably, no separation of solid particulate material from the aqueous suspension occurs during or between application of the reagents applied to form the said precipitate. In other words, the concentration of suspended particulate material comprising kaolin (excluding formed precipitate) remains the same during addition of the first and second reagents applied to produce the precipitate. As described below, the first and second reagents may comprise respectively calcium oxide or hydroxide and carbon dioxide.

DESCRIPTION OF THE PRESENT INVENTION

The method according to the present invention may be applied to treat aqueous suspensions of particulate material which comprises kaolin.

The kaolin may comprise particles having an average size on a weight average basis in the range 0.1 $\mu$m to 50 $\mu$m. The average diameter of the particles may be less than 25 $\mu$m, in many cases less than 5 $\mu$m. The particles may be finely divided, ie they may generally have an average particle diameter smaller than 2 $\mu$m. In some cases, the average particle diameter may be smaller than 1 $\mu$m, and even smaller than about 0.5 $\mu$m. Particles smaller than 1 $\mu$m especially smaller than 0.5 $\mu$m are those which have given the greatest dewatering problems in the prior art, as discussed earlier.

The kaolin particles may be present with other inorganic particles. Preferably, at least 75%, eg from 50% to 99% by weight of the particles of the suspension are of kaolinite. The particles may have been obtained from a primary, secondary, or tertiary kaolin mineral source, eg from a china clay or a ball clay. In embodiments described later the particles may have a particle size distribution such that from 55% to 100% by weight have a size less than 5 $\mu$m, from 30% to 95% by weight may have a size less than 2 $\mu$m; from 20% to 90% by weight may have a size less than 1 $\mu$m and from 5% to 75% by weight may have a size less than 0.5 $\mu$m.

In this specification, all particle sizes are as measured by a SEDIGRAPH™ 5100 machine supplied by Micromeritics Corporation, USA, using a fully dispersed aqueous suspension of the material of the material under test. Using this instrument the cumulative percentage by weight of the particles finer than a given size value is plotted against the given size value. The particle 'size' plotted is the so called equivalent spherical diameter.

The aqueous suspension of particulate kaolin may be pre-treated prior to the precipitation step(a) as described earlier to render the suspension suitable for treatment. For example, the suspension may be concentrated or diluted as described hereinafter or the particulate material may be subjected to a processing step, eg treatment by a surface treatment agent in a known way to give a surface chemical and/or physical functionality.

The suspension may be obtained from a plant for processing kaolin and may comprise either a product stream whose properties require improvement or a separated particulate fraction which may hitherto have been considered too fine to process further. An aqueous suspension of the composite particulate product resulting from the method of the present invention is relatively easy to dewater as illustrated hereinafter.

The particles of the kaolin particulate material in the treated aqueous suspension may have on their surface a polymeric material such as a dispersing agent present in a trace amount which was added in a previous processing step. This would normally have the effect of making a suspension of the particulate material harder to dewater and so the present invention, therefore, applied to treat such particles is especially beneficial.

Use of the present invention to treat a kaolin-containing aqueous suspension shows several important advantages as follows over the prior art processes, especially processes in which fines are collected by the use of chemicals.

Firstly, the use of expensive chemicals can be avoided.

Secondly, the water containing the particles to be treated can if required be more efficiently and fully clarified making the clarified water more suitable for re-cycle and re-use.

Thirdly, the loss of useful fine particulate materials can be reduced or eliminated by recovering the fines more efficiently and fully.

Fourthly, fines-containing material which is recovered does not have to be discarded. It can be used in various applications in which alkaline earth metal carbonates, eg precipitated calcium carbonate "pcc", are known to be useful per se. For example, the composite comprising precipitate and fines can be used in paper making, eg as a particulate filler either alone or blended with other conventional filler additives, and may beneficially be used in a paper making process. The composite material may alternatively be used in the other applications described hereinafter.

Fifthly, various properties of the kaolin or of a composition in which it is subsequently incorporated may be unexpectedly and beneficially improved. For example, as illustrated later the composite particulate product may have a higher brightness, a lower yellowness in both the powder form and when formed into a paper coating composition than the kaolin from which it is formed. Also, in a coating composition the optical opacity and scattering may be improved by forming the composite. When used as a paper filler the composite product may show similar optical property improvements as well as improved burst strength in the filled paper sheet compared with the kaolin per se.

The form of crystals produced in the precipitation process in the method according to the present invention is not critical to achieve these improvements. In general a mixture of known forms will be produced. However, it may be, desirable to precipitate in a known way crystals comprising a substantial proportion of a selected form, eg aragonite or scalenohedral crystals, where the precipitate is a pcc.

The aqueous suspension of the composite particulate product formed in the method of the present invention may be treated so as to separate partially or fully the aqueous host medium from the aggregate solids using one or more separation processes which may be known processes. For example, processes such as filtration, sedimentation, centrifugation or evaporation may be used. The separated aqueous medium, eg water, may, optionally with further purification or clarification by one or more chemical, biochemical or mechanical processes which may be known per se, be recycled for reuse, eg in a paper mill, eg for use in diluting the paper making stock or for use as showers for washing machinery.

The separated solids may be assessed for quality control by measurements taken on samples and subsequently delivered to a storage tank and thereafter supplied as necessary for use in a user application, eg for use as a filler or pigment for making paper making or paper coating products, eg in a paper mill, or alternatively as a filler for other known particulate filler or extender and/or reinforcing applications, ie in polymer, paint, resin, cement, concrete compositions and the like. The solids containing suspension may if required be re-diluted for use at the user plant.

It is not necessary for the aqueous suspension containing the composite product comprising precipitate and kaolin formed by the method according to the present invention to be dewatered prior to supply for use in a user application, eg use in the paper mill. The aqueous suspension or slurry may be delivered to a storage tank or directly to the user plant without substantial dewatering.

Where the product comprising a composite of precipitate crystals and kaolin is to be used as a filler in a paper making composition, the product may be supplied to the mill in one of various concentrations in water. The concentration may range from dilute suspension form to dry particulate solids. The product after formation in the method according to the present invention may or may not be treated as appropriate, eg by dewatering or not, so that it may be delivered to the user plant, eg paper making mill in the required concentration. The extent of dilution or concentration of the form in which the product is added to a paper making composition does not critically affect the properties of the resulting paper sheet. It may, however, for economic and practical reasons be more suitable to supply the product in the form of a concentrated pumpable aqueous slurry whose concentration is limited only by the rheological behaviour of the slurry, ie its pumpability. Where the product is supplied for use in a process at another location it may be preferable to dry the product prior to transport. Where the product has been concentrated or dried prior to delivery and subsequently re-dispersed in or diluted with clean water prior to re-use, the concentration and dilution steps do not materially affect the usefulness of the product. In any event, as will be clearly evident to those familiar with the paper making art, the product may be blended in various proportions with conventional filler materials, eg precipitated or natural, eg ground, calcium carbonate, kaolin and other clay minerals, metakaolin, talc, calcium sulphate etc., the ingredients and composition as well as the host fibres being selected according to the quality of paper required to be produced. In general, these materials are likely to be in slurry form when they are mixed.

The paper maker will normally select the concentration of the composite material (produced in accordance with the present invention) in aqueous suspension and the delivery rate of the suspension at the point of addition to the paper making composition, eg finish. As noted above, this may require re-dilution of a suspension which has been delivered to the paper mill in concentrated form. Generally, the suspension added may contribute composite material which forms up to about 30% by weight of the solids content of the paper making composition. Where other fillers, eg conventional inorganic particulate material such as one or more of kaolin, metakaolin, calcium sulphate, mica, talc, titanium dioxide and ground or precipitated calcium carbonate, also form part of the filler content of the paper making composition a total filler composition of up to about 30% by weight of the solids content of the paper composition may be employed.

Where the aqueous suspension to be treated contains less than the appropriate level of solids, ie less than 0.5% by weight, it may be concentrated in a known way, eg using dissolved air flotation or centrifugation or other known processes. Similarly, the stream if concentrated initially may be diluted; eg to at least 2% solids level, if required, using clean water.

The treated suspension containing the composite particulate product comprising precipitate of alkaline earth metal carbonate and entrained kaolin particulate material (or the separated solid material itself) may, as noted above, be used, eg by recycling to supplement the filler being used in the sheet forming process in a paper sheet forming mill or to form a paper coating composition. Alternatively, or in addition, water separated from the suspension containing the composite product of precipitated alkaline earth metal carbonate and entrained kaolin particles may be reused in a water using industrial operation, eg kaolin processing.

In the method of the present invention, the alkaline earth metal carbonate precipitate may be formed by introducing into the suspension constituting the aqueous suspension of kaolin particles to be treated a source of alkaline earth metal ions and a source of carbonate ions. Preferably this is carried out in a reaction vessel into which the suspension to be treated, optionally after concentration or dilution as appropriate, is introduced. This will form the desired precipitate of alkaline earth metal carbonate in situ which will entrain and bond to the kaolin particles in the suspension. The first reagent which is added is preferably uniformly distributed throughout the aqueous suspension to avoid local concentration gradients. When the first reagent is sparingly soluble, as is the case with calcium hydroxide, thorough mixing is desirable. It is also desirable that the suspension should be agitated whilst the second reagent is added in order to ensure that the precipitate crystals are formed in an even distribution.

It is preferred to add the source of alkaline earth metal ions followed by the source of carbonate ions; desirably addition of the source of carbonate ions is continued until the pH of the suspension remains at a value in the range 7 to 9. A mixed composite product which gives good improved properties may be made in this way as exemplified hereinafter.

The conditions under which the alkaline earth carbonate crystals are precipitated may be chosen to give at least an amount of preferred crystal form as described hereinbefore. The temperature of the treated aqueous suspension may, for example, be selected to be in a preferred temperature range, eg 35° C. to 55° C., within the general temperature range 10° C. to 80° C.

The source of carbonate ions is conveniently carbon dioxide gas which is introduced into the suspension containing the kaolin particulate material and the source of alkaline earth metal ions. The carbon dioxide gas may be substantially pure as supplied in gas cylinders or may be present in a mixture of gases such as flue gases or together with a carrier gas, eg air. Alternatively, the source of carbonate ions may be an alkali metal carbonate or ammonium carbonate. Sodium carbonate is especially preferred on account of its relative cheapness and availability.

The source of alkaline earth metal ions may be introduced into the suspension, either by slaking an alkaline earth metal oxide, for example calcium oxide or quicklime, in the suspension, or by adding to the suspension a separately prepared suspension of an alkaline earth metal hydroxide.

Where the alkaline earth metal oxide is slaked in water, the slaking may be at a temperature in the range 10° C. to 80° C., eg a temperature in the range from 40° C. to 50° C., and the suspension of the alkaline earth metal oxide in the water is preferably agitated vigorously for a time of up to 30 minutes to ensure that the slaking is complete. The suspension may optionally be cooled after slaking.

The source of alkaline earth metal ions may alternatively be a water-soluble alkaline earth metal salt, for example the chloride or nitrate.

The quantity of the source of alkaline earth metal ions and the source of carbonate ions used is preferably such as to precipitate sufficient alkaline earth metal carbonate to increase the dry solids content of the aqueous suspension to within the range from 5% to 30% by weight. The weight ratio of the kaolin-containing particulate material (prior to precipitated-ion) to alkaline earth metal carbonate (preferably calcium carbonate) precipitated therewith will depend upon the nature of the particulate material. For example, for fine kaolinite, only about 25% by weight of the composite product may need to be alkaline earth metal carbonate to give acceptable dewatering.

If desired, a reducing or oxidising bleaching agent may be added to the suspension containing the kaolin-containing particulate material or by-product in order to improve its whiteness. The reducing bleaching agent may be, for example, a dithionite salt, such as sodium or zinc dithionite, or zinc dust and sulphur dioxide. The amount of the reducing bleaching agent used is preferably in the range from 1.5 to 7.5 grams of the reducing bleaching agent per kilogram of dry particulate material. The bleaching agent may be added after the addition of the first reagent, but before addition of the second reagent.

According to a second aspect of the present invention there is provided a composite particulate product comprising particulate bonded aggregates consisting essentially of pre-cipitated alkaline earth metal carbonate (preferably calcium carbonate) and a particulate material comprising kaolin, the particles of which are entrained by and bonded to the alkaline earth metal carbonate precipitate. Such a product can be used in the preparation of a paper-making composition or a paper-coating composition or in one of the other applications described earlier. A paper making composition will contain, in aqueous suspension, and in addition to the aggregated filler of the invention (and optionally other filler materials), cellulosic fibres and other conventional additives known in the art. A typical paper making composition would contain up to about 67% by weight of dry filler material, based on the dry weight of the paper making fibres, and may also contain a cationic or an anionic retention aid in an amount in the range from 0.1 to 2% by weight, based on the dry weight of the filler material. It may also contain a sizing agent which may be, for example, a long chain alkylketene dimer, a wax emulsion or a succinic acid derivative. The composition may also contain dye and/or an optical brightening agent. A paper coating composition will contain, in aqueous suspension, and in addition to the aggregated pigment of the invention (and optionally other filler materials), an adhesive. The formula of the paper coating composition will depend upon the purpose for which the coated paper is to be used, i.e. either for offset or gravure printing. Generally speaking, the amount of adhesive will be in the range from 3 to 35% by weight of adhesive solids, based on the dry weight of the coating pigment. There will also be present from 0.01 to 0.5% by weight, based on the dry weight of the coating pigment, of a dispersing agent. Sufficient alkali will generally be added to raise the pH to about 8–9. The adhesive solids may be a starch, a water dispersible synthetic resin or latex such as a styrene butadiene copolymer, a polyvinyl alcohol an acrylic polymer, polyvinyl acetate, a butadiene-acrylonitrile copolymer, a cellulose derivative such as methyl cellulose, sodium carboxymethyl cellulose or hydroxyethyl cellulose or a proteinaceous material such as casein, animal glue or a vegetable protein.

The invention will now be illustrated by reference to the following Examples.

DESCRIPTION OF ILLUSTRATIVE EMBODIMENTS

EXAMPLE 1

Quicklime (252 g) was added to 4,500 cm$^3$ of an aqueous suspension at a temperature of 50° C. containing 7.5% by weight of kaolin clay particles of average particle size 0.22 $\mu$m. The suspension was stirred vigorously for 25 minutes to ensure adequate slaking of the quicklime. The pH of the suspension was then found to be 12.5.

There was then introduced into the suspension of clay particles and calcium hydroxide a gas mixture containing 25% by volume of carbon dioxide at a rate of 5,242 cm$^3$.min$^{-1}$, which corresponds to 0.013 moles of carbon dioxide per minute per mole of calcium hydroxide. The gas mixture was introduced into the suspension as a fine stream of bubbles and vigorous stirring was maintained throughout the introduction.

The pH of the suspension was continuously monitored and the introduction of the gas mixture was continued until the pH of the suspension had fallen to below 8.0.

The particulate component of the resultant suspension which contained 54% by weight of calcium carbonate was examined by means of an electron microscope and was found to comprise a co-aggregated mixed mineral (see the Figure in which the platy particles are the kaolinite and the white "fluffy" particles are the precipitated calcium carbonate).

EXAMPLE 2

The experiment described in Example 1 was repeated several times there being added in each case to the suspension of kaolin clay particles a different amount of the quicklime such that the composition of the mixed mineral produced varied in the range from 35% to 73% by weight of calcium carbonate. As a control, a further suspension was prepared by slaking 252 g of quicklime in 4,500 cm$^3$ of water which was free of kaolin particles. In each case there was introduced into the suspension 0.013 moles of carbon dioxide per minute per mole of calcium hydroxide.

The suspension of the mixed mineral produced in each case was filtered and the cake of mixed mineral was remixed with water to form a suspension containing 30% by weight of dry mixed mineral, which suspension was used to measure the Kubelka-Munk scattering coefficient, S, by the following method:

A sheet of synthetic plastics paper material, sold by Arjo Wiggins Appleton plc under the Registered Trade Mark "SYNTEAPE", was cut into a number of pieces each of size 10 cm×6 cm, and each piece was weighed and tested for percentage reflectance to light of wavelength 457 nm when placed over a black background by means of an "ELRE-PHO" spectrophotometer to give the background reflectance $R_b$. The preweighed pieces of plastics paper were then coated with different amounts of the suspension of mixed mineral to give coat weights in the range from 5 to 20 g.m$^{-2}$. Each coating was allowed to dry in the air and the area of dry coating on each piece of plastics paper was standardised by placing a circular template over the coating and carefully removing surplus coating which lay outside the periphery of the template. Each piece of plastics paper bearing a coated area was then reweighed, and, from the difference in weight and the dimensions of the coated area, the coat weight X in kg.m$^{-2}$ was calculated.

Each coated area was then tested for reflectance to light of wavelength 457 nm when the piece of plastics paper was placed (a) on a black background ($R_0$); and (b) on a pile of uncoated pieces of the plastics paper ($R_1$). Finally the reflectance to light of wavelength 457 nm was measured for the pile of uncoated pieces alone (r).

From these measurements the reflectance $R_c$ of the coating alone was calculated from the formula:

$$R_c = \frac{R_1 \cdot R_b - R_0 \cdot r}{(R_1 - R_0) \cdot rR_b + Rb - r}$$

and the transmission $T_c$ of the coating from the formula:

$$T_c^2 = \frac{(R_0 - R_c)(1 - R_c R_b)}{R_b}$$

From these two quantities it is possible to calculate a theoretical value for the reflectance $R_{00}$, of a coating layer of infinite thickness of the same material from the formula:

$$\frac{1 - T_c^2 + R_c^2}{R_c} = \frac{1 + R_{00}^2}{R_{00}}$$

The Kubelka-Munk scattering coefficient S in m$^2$.kg$^{-1}$ may now be calculated from the formula:

$$SX = \frac{1}{b}\coth^{-1} \cdot \frac{1 - aR_c}{bR_c}$$

where $$a = \frac{1}{2}\left[\frac{1}{R_{00}} + R_{00}\right]$$

and $$b = \frac{1}{2}\left[\frac{1}{R_{00}} + R_{00}\right]$$

The scattering coefficient S was plotted against the coat weight X and the value of S in each case for a coat weight of 8 g.m$^{-2}$ was found by interpolation.

The results obtained are set forth in Table 1.

TABLE 1

| weight % calcium carbonate | scattering coefficient S |
|---|---|
| 35 | 227 |
| 54 | 265 |
| 73 | 276 |
| 100 | 253 |

EXAMPLE 3

The experiment described in Example 1 was repeated except that there was added to the suspension of kaolin clay particles, before the quicklime, 1.69 g of sodium dithionite as a reducing bleaching agent. The particulate component of the suspension on completion of the treatment with carbon dioxide gas was separated by filtration and dried in an oven for 16 hours at 80° C. The resultant dry cake was pulverised and the reflectances to light of wavelength 457 nm and 570 nm, respectively, were measured by means of an "ELREPHO" spectrophotometer.

The experiment was repeated except that no sodium dithionite was added to the suspension of kaolin clay particles.

The results obtained are set forth in Table 2 below:

TABLE 2

| | % reflectance to light of wavelength | |
|---|---|---|
| | 457 nm | 570 nm |
| with sodium dithionate | 89.9 | 94.6 |
| without sodium dithionate | 88.8 | 94.2 |

EXAMPLE 4

The experiment described in Example 1 was repeated several times there being added in each case to the suspension of kaolin clay particles a different amount of the quicklime such that the composition of the mixed mineral produced varied in the range from 0.5% to 99.5% by weight of calcium carbonate. In each case there was introduced into the suspension 0.013 moles of carbon dioxide per minute per mole of calcium hydroxide.

A small sample of the suspension of the mixed mineral produced in each case was poured into a Buchner filter funnel provided with a piece of standard filter paper, the side arm of the filtrate flask being connected to the laboratory vacuum source. The filtrate was collected in a measuring cylinder inside the filtrate flask, and at intervals the volume of filtrate collected and the time which had elapsed since the start of filtration were recorded. The square of the volume collected was plotted graphically against the elapsed time, and a curve was obtained which had a large central straight line portion. The slope of this straight line portion was recorded in each case.

The relationship between the square of the volume of filtrate collected and the elapsed time is given by the Carmen-Kozeny equation:

$$\frac{Q^2}{T} = \frac{2 \cdot A^2 \cdot P \cdot E^3 \cdot (y - 1)}{5 \cdot v \cdot S^2 \cdot (1 - E^2) \cdot d^2}$$

where:

Q is the volume of filtrate collected;
T is the elapsed filtration time;
A is the area of the filter medium;
P is the differential pressure across the filter medium;
E is the fraction of voidage in the filter cake;
v is the viscosity of the suspending medium;
S is the specific surface area of the particulate phase; and
d is the specific gravity of the particulate phase.

The slope $Q^2/T$ of the straight line portion of the graph plotted for each suspension gave a measure of the filtration rate in each case and, since A, P, v, S and d can be assumed to be constant under the conditions of the experiment, a standardised filtration rate F can be found to be given by:

$$F = \frac{Q^2 \cdot R}{T}$$

where:

$$R = \frac{\frac{1}{d} + \frac{W_c}{S_c}}{\frac{W_s}{S_s} - \frac{W_c}{S_c}}$$

where:

$W_c$ is the weight fraction of water in the cake;
$S_c$ is the weight fraction of solids in the cake;
$W_s$ is the weight fraction of water in the suspension; and
$S_s$ is the weight fraction of solids in the suspension.

Suspensions were also prepared by mixing with 4,500 cm³ of the suspension of fine kaolin clay particles different quantities of precipitated calcium carbonate which had been prepared separately from the kaolin clay suspension by carbonating milk of lime. The filtration rate for each mixed suspension and the percentage by weight of dry material in the cake were measured as described above.

The results obtained are set forth in Table 3 below:

TABLE 3

| % by weight of precipitated calcium carbonate in mixture | Precipitated in situ | | Separately mixed | |
|---|---|---|---|---|
| | Filtration rate (F) | % by wt. solids | Filtration rate (F) | % by wt. solids |
| 0 | 0.001 | 73.8 | 0.001 | 73.8 |
| 35 | 0.380 | 42.7 | | |
| 50 | | | 0.167 | 55.9 |
| 54 | 1.090 | 38.1 | | |
| 100 | 7.880 | 35.4 | 7.880 | 35.4 |

These results show that, for a given percentage by weight of precipitated calcium carbonate in the mixture, a higher filtration rate is obtained if the calcium carbonate is precipitated in the presence of the fine kaolin than if it is precipitated separately and then added to the suspension of fine kaolin.

EXAMPLE 5

Different quantities of quicklime were added to 4,500 cm³ portions of an aqueous suspension at a temperature of 50° C. containing 7.5% by weight of Wyoming sodium bentonite particles of average particle size smaller than 0.1 $\mu$m. In each case the suspension was stirred vigorously for 25 minutes to ensure adequate slaking of the quicklime.

There was then introduced into each suspension of bentonite particles and calcium hydroxide a gas mixture containing 25% by volume of carbon dioxide at a rate of 0.013 moles of carbon dioxide per minute per mole of calcium hydroxide. The gas mixture was introduced into the suspension as a fine stream of bubbles and vigorous stirring was maintained throughout the introduction. The pH of the suspension was continuously monitored and the introduction of the gas mixture was continued until the pH of the suspension had fallen to below 8.0.

The filtration rate, F, and the percentage by weight of water retained in the filter cake were measured for each suspension as described in Example 4 above. The results obtained are set forth in Table 4 below:

TABLE 4

| % by wt. of precipitated calcium carbonate in mixture | Filtration rate (F) | % by wt. solids |
|---|---|---|
| 80 | 0.070 | 43.7 |
| 95 | 1.510 | 41.5 |
| 99 | 2.140 | 44.0 |
| 100 | 7.880 | 35.4 |

These results show that, when the amount of calcium carbonate precipitated in the suspension is about 90% or more of the total weight of dry bentonite and calcium carbonate, the suspension can be dewatered by filtration at a very advantageous rate, but even when the proportion of calcium carbonate in the mixture is 80% by weight, the rate of filtration would be acceptable in a commercial process.

EXAMPLE 6

11.25 g of quicklime was added to 1000 ml of an aqueous suspension containing 180 g of a kaolin clay having a particle size distribution such that 80% by weight consisted of particles having an equivalent spherical diameter smaller than 2 $\mu$m. The solids content of the kaolin clay suspension before the addition of the quicklime was 16.2% by weight. The suspension was maintained at a temperature of 50° C. and vigorously stirred for 25 minutes to ensure adequate slaking of the quicklime.

A gas mixture comprising 25% by volume of carbon dioxide was then introduced into the suspension as a fine stream of bubbles at a rate of 0.13 moles of carbon dioxide per minute per mole of calcium hydroxide. The temperature of the suspension was maintained at 45° C. and the gas mixture was introduced with continuous agitation of the suspension until the pH of the suspension had fallen to below 8.0.

The experiment described above was repeated three more times except that 11.25 g of quicklime was added to 1000 ml of an aqueous suspension containing, respectively, 60 g, 20 g and 6.7 g of the kaolin clay. The solids content of the suspension of kaolin clay in each case before the addition of the quicklime was, respectively, 16.2%, 5.8%, 2.0% and 0.7% by weight.

A suspension was also prepared containing 180 g of the kaolin clay alone in 1000 ml of the suspension. A further suspension was prepared by adding quicklime to 1000 ml of water and carbonating the calcium hydroxide thus formed under the conditions described above.

The filtration rate, F, and the percentage by weight of water retained in the filter cake were measured for each suspension as described in Example 4 above. The results obtained are set forth in Table 5 below:

TABLE 5

| % by wt. of precipitated calcium carbonate in mixture | % by wt. of solids in kaolin suspension | Filtration rate (F) | % by wt. of solids in cake |
|---|---|---|---|
| 0 | 16.2 | 0.06 | 66.9 |
| 10 | 16.2 | 0.21 | 58.1 |

TABLE 5-continued

| % by wt. of precipitated calcium carbonate in mixture | % by wt. of solids in kaolin suspension | Filtration rate (F) | % by wt. of solids in cake |
|---|---|---|---|
| 25 | 5.8 | 0.61 | 50.1 |
| 50 | 2.0 | 0.93 | 49.4 |
| 75 | 0.7 | 1.38 | 44.7 |
| 100 | 0 | 2.54 | 40.1 |

EXAMPLE 7

95.8 g of quicklime was slaked in 8000 ml of an aqueous suspension containing 5% by weight of a paper coating grade English kaolin clay (Kaolin KA) comprising about 94% by weight kaolinite and having a particle size distribution as follows:

| x | % by weight finer than x |
|---|---|
| 5 μm | 96 |
| 2 μm | 81 |
| 1 μm | 65 |
| 0.5 μm | 42 |

The temperature of the suspension was adjusted to 50° C. before the introduction of the quicklime and the mixture was vigorously stirred for 25 minutes to ensure substantially complete slaking of the quicklime.

A gas mixture comprising 20% by volume of carbon dioxide, the remainder being air, was then introduced into the suspension as a fine stream of bubbles at a rate of 0.05 moles of carbon dioxide per minute per mole of calcium hydroxide. The temperature of the suspension was adjusted to 45° C. and the gas mixture was introduced with continuous agitation of the suspension by means of a stirrer rotating at 500 rpm until the pH of the suspension had fallen to below 8.0.

Calcium carbonate was precipitated in crystalline form bonded upon and between the particles constituting the kaolin clay, and the resultant material was found to be a composite mixed mineral comprising kaolinite and precipitated calcium carbonate. The theoretical amount of calcium carbonate which could be yielded by the original 95.8 g of quicklime (CaO) was 171.1 g, and the dry weight of kaolin clay originally present in the suspension in which the quicklime was slaked was 400 g. The weight ratio of calcium carbonate to kaolin was therefore assumed to be 30:70. This co-aggregated mixed mineral is identified below as Composite Pigment PA.

A second composite mixed mineral was prepared by the method for Composite Pigment PA described above, except that the amount of quicklime originally slaked in the 8000 ml of suspension containing 5% by weight of Kaolin KA was 522 g. In this case the carbon dioxide-containing gas mixture was bubbled through the suspension at a rate of 0.01 moles of carbon dioxide per minute per mole of calcium hydroxide. The theoretical amount of calcium carbonate which could be yielded by the original 522 g of quicklime (CaO) was 932.1 g, and the dry weight of kaolin clay originally present in the suspension in which the quicklime was slaked was 400 g. The weight ratio of calcium carbonate to kaolin was therefore assumed to be 70:30. In this case the composite mixed mineral is identified below as Composite Pigment PB.

The filtration properties of each of Composite Pigments PA and PB were measured by the procedure described in Example 4 earlier.

The cake of Composite Pigment (PA or PB) produced in each case was remixed with water to form a suspension containing 30% by dry weight of mixed mineral, which suspension was used to measure the Kubelka-Munk scattering coefficient, S, by the method described in Example 2 earlier.

The powder brightness of each of the Composite Pigments PA and PB was also measured. Powder brightness is defined as the percentage reflectance to light of wavelength 457 nm as measured in accordance with International Standard No ISO 2470 and powder yellowness is defined as the difference between the percentage reflectance of the powder to light of wavelength 457 nm and the percentage reflectance to light of wavelength 570 nm, both measured in accordance with International Standard No ISO 2470.

As a control, the above experiments were repeated using the uncomposited Kaolin KA as the mineral pigment.

The results of the various measurements are set forth in Table 6 as follows.

TABLE 6

| Pigment | Wt Ratio $CaCO_3$: Kaolin | Filtration rate | % by wt solids in cake | Scattering coefft (S) | % reflectance to light of wavelength | |
|---|---|---|---|---|---|---|
| | | | | | 457 nm | 570 nm |
| Composite Pigment PA | 30:70 | 0.62 | 50.3 | 232 | 88.2 | 91.9 |
| Composite Pigment PB | 70:30 | 3.30 | 42.9 | 254 | 90.6 | 93.9 |
| Kaolin KA | — | 0.04 | 68.6 | 179 | 85.4 | 89.8 |

These results show that the Composite Pigments PA and PB dewater more readily by filtration, have a higher light scattering ability, a higher powder brightness and a lower yellowness than the original uncomposited Kaolin KA.

EXAMPLE 8

Samples of the suspensions of Composite Pigments PA and PB employed in Example 7 were dewatered by high pressure filtration to give cakes of dry solids content about 70% by weight. Each of these cakes was then mixed with a quantity of an aqueous solution of a sodium polyacrylate dispersing agent to form a fluid suspension of high solids concentration.

In the case of Composite Pigment PA, 0.4% by weight of the active dispersing agent, based on the dry weight of pigment solids, was added initially and a further 0.35% by weight on the completion of mixing. The final solids concentration of the suspension thus formed was 63.0% by weight.

In the case of Composite Pigment PB, 0.95% by weight of the active dispersing agent, based on the dry weight of pigment solids, was added initially and a further 0.15% by weight on the completion of mixing. The final solids concentration of the suspension was 63.8% by weight.

Each of these Composite Pigment suspensions was incorporated into a paper coating composition having the following formulation:

100 parts by weight Composite Pigment 11 parts by weight styrene butadiene latex adhesive 0.5 parts by weight of sodium carboxymethyl cellulose viscosifier 0.75 parts by weight of glyoxal insolubiliser.

Each composition was coated onto an offset base paper of substance weight 40 g.m$^{-2}$ on a laboratory paper coating machine of the type described in GB-A-1032536 operating at a paper speed of 400 m.min$^{-1}$. Samples of each composition were coated at a series of different blade pressures to give different weights per unit area on the paper web. Each sample of paper was calendered before testing by being passed 10 times through the nip of a laboratory supercalender the rolls of which were turning at a peripheral speed of 40 m.min$^{-1}$ at a temperature of 65° C. and a line pressure of 87.6 kN.m$^{-1}$. Measurements of the paper properties described below were made on a sample of coated paper at each coat weight and, for each property, the value of the property which corresponded to a coat weight of 10 g.m$^2$ was found by interpolation.

The percentage reflectance of samples of the calendered coated paper to light of 457 nm and 570 nm wavelength was measured by means of a DATACOLOR "ELREPHO" 3000 spectrophotometer ("DATACOLOR" and "ELREPHO" are trade marks) fitted with a xenon light source which emits light rich in radiation of wavelength in the ultraviolet range.

The samples of calendered coated paper were also tested for gloss according to TAPPI Standard No 480 ts-65. The intensity of light reflected at an angle from the surface of the paper was measured and compared with a standard of known gloss value. The beams of incident and reflected light were both at an angle of 75° to the normal to the paper surface. The results are expressed in TAPPI gloss units.

The smoothness of the calendered coated paper surfaces was measured by the Parker Print Surf test. This test comprises measuring the rate at which air under pressure leaks from a sample of the coated paper which is clamped, under a known standard force, between an upper plate which incorporates an outlet for the compressed air and a lower plate, the upper surface of which is covered with a sheet of a either a soft or a hard reference supporting material according to the nature of the paper under test. From the rate of escape of the air, a root mean cube gap in $\mu$m between the paper surface and the reference material is calculated. A smaller value of this gap represents a higher degree of smoothness of the surface of the paper under test. The samples of calendered coated paper were tested for Parker Print Surf using the soft backing material and a pressure of 1000 kPa.

Samples of calendered coated paper from each batch were tested for opacity by means of a DATACOLOR "ELREPHO" 3000™ spectrophotometer set to embrace a broad spectrum of wavelengths. A measurement of the percentage of the incident light reflected was made with a stack of ten sheets of paper over the black cavity of the brightness meter ($R_\infty$). Of these ten sheets, the top five were from the sample of paper currently under test, and the remaining five were sheets from other samples which were used merely to ensure that the stack was completely opaque. The ten sheets were then replaced with the single sheet from the top of the stack of five test sample sheets over the black cavity and a further measurement of the percentage reflectance was made (R). The percentage opacity was calculated from the formula:

Percentage opacity=$100.R/R_\infty$

The procedure was performed five times with each time a different sheet of paper on top of the stack, and the complete sequence of steps was then repeated to give a total of ten results from which the average value of the percentage opacity was determined.

Again, as a control, the above experiments were repeated using Kaolin KA as the sole pigment in a paper coating composition having the same formulation as for Pigments PA and PB.

The results of the various sheet measurements are set forth in Table 7 as follows.

TABLE 7

| Pigment | Wt Ratio CaCO$_3$: Kaolin | % reflectance to light of wavelength | | Gloss (TAPPI units) | Smoothness | Opacity |
|---|---|---|---|---|---|---|
| | | 457 nm | 570 nm | | | |
| Composite Pigment PA | 30:70 | 73.7 | 82.6 | 59 | 0.79 | 89.0 |
| Composite Pigment PB | 70:30 | 74.9 | 83.9 | 44 | 0.83 | 89.4 |
| Kaolin KA | — | 70.5 | 81.8 | 53 | 0.89 | 88.6 |

It can be seen that the paper coating compositions containing the Composite Pigments PA and PB produced coated papers which have a higher brightness and lower yellowness than the coated paper using the original Kaolin KA as the sole pigment. The Composite Pigments PA and PB also give coated papers which are generally smoother and which have more opaque coatings than the coated paper using the original Kaolin KA. In the case of the gloss of the coated papers, the paper coating containing Composite Pigment PA is more glossy, and the paper coating containing Composite Pigment PB less glossy, than the paper coating containing Kaolin KA. A paper coating composition containing Composite Pigment PB is very useful in preparing a relatively matt coated paper of high brightness and opacity.

EXAMPLE 9

74.7 g of quicklime was slaked in 667 ml of an aqueous suspension containing 5% by weight of a paper filler grade English kaolin clay (Kaolin KB) comprising about 81% by weight kaolinite and about 16% mica and having a particle size distribution as follows:

| x | % of particles smaller than x |
|---|---|
| 5 $\mu$m | 60 |
| 2 $\mu$m | 33 |
| 1 $\mu$m | 22 |
| 0.5 $\mu$m | 8 |

The temperature of the suspension was adjusted to 50° C. before the introduction of the quicklime and the mixture was vigorously stirred for 25 minutes to ensure substantially complete slaking of the quicklime. The quantities of quicklime and of the 5% by weight suspension of kaolin clay were such that 2 gram moles (148 g) of calcium hydroxide were present per liter of the suspension. The volume of the suspension was then made up to 8000 ml by adding a further 7333 ml of the kaolin clay suspension.

A gas mixture comprising 18.4% by volume of carbon dioxide, the remainder being air, was then introduced into the suspension as a fine stream of bubbles at a rate of 0.026 moles of carbon dioxide per minute per mole of calcium hydroxide. The temperature of the suspension was adjusted to 35° C. and the gas mixture was introduced with continuous agitation of the suspension by means of a stirrer rotating at 500 rpm until the pH of the suspension had fallen to below 8.0.

Calcium carbonate was precipitated in crystalline form bonded upon and between the particles constituting the kaolin clay, and the resultant material was found to be a composite mixed mineral comprising kaolinite and precipitated calcium carbonate. The theoretical amount of calcium carbonate which could be yielded by the original 74.7 g of quicklime was 133.4 g, and the total weight of dry kaolin clay in the suspension was 400 g. The weight ratio of calcium carbonate to kaolin was therefore assumed to be 25:75. This composite mixed mineral is identified below as Composite Pigment PC.

A second composite mixed mineral was prepared by the method described for Composite Pigment PC above, except that 224 g of quicklime were slaked in 2000 ml of the suspension containing 5% by weight of Kaolin PB before the volume of the suspension was made up to 8000 ml by adding a further 6000 ml of the kaolin suspension. In this case the carbon dioxide-containing gas mixture was bubbled through the suspension at a rate of 0.012 moles of carbon dioxide per minute per mole of calcium hydroxide. The theoretical amount of calcium carbonate which could be yielded by the original 224 g of quicklime was 400 g, and the total dry weight of kaolin clay in the suspension was also 400 g. The weight ratio of calcium carbonate to kaolin was therefore assumed to be 50:50. The composite mixed mineral is identified below as Composite Pigment PD.

A third composite mixed mineral was prepared by the method described for Composite Pigment PC above, except that 672 g of quicklime were slaked in 6000 ml of the suspension containing 5% by weight of Kaolin KB before the volume of the suspension was made up to 8000 ml by adding a further 2000 ml of the kaolin suspension. In this case the carbon dioxide-containing gas mixture was bubbled through the suspension at a rate of 0.0063 moles of carbon dioxide per minute per mole of calcium hydroxide. The theoretical amount of calcium carbonate which could be yielded by the original 672 g of quicklime was 1200 g, and the total weight of dry kaolin clay in the suspension was 400 g. The weight ratio of calcium carbonate to kaolin was therefore assumed to be 75:25. The composite mixed mineral is identified below as Composite Pigment PE.

A fourth composite mixed mineral was prepared by the method described for Composite Pigment PC above, except that 896 g of quicklime were slaked in a mixture of 1684 ml of the suspension containing 5% by weight of Kaolin KB with 6316 ml of water to make the total volume up to 8000 ml. In this case the carbon dioxide-containing gas mixture was bubbled through the suspension at a rate of 0.0061 moles of carbon dioxide per minute per mole of calcium hydroxide. The theoretical amount of calcium carbonate which could be yielded by the original 896 g of quicklime was 1600 g, and the total weight of dry kaolin clay in the suspension was 84.2 g. The weight ratio of calcium carbonate to kaolin was therefore assumed to be 95:5. The composite mixed mineral is identified below as Composite Pigment PF.

The filtration properties, the Kubelka-Munk scattering coefficient, S, and the powder brightness of each of the composite pigments were measured by the procedures described in earlier Examples.

As a control the above experiments were repeated using Kaolin KB uncomposited as the mineral pigment.

The results of the various measurements are set forth in Table 8 below.

TABLE 8

| Pigment | Wt Ratio $CaCO_3$: Kaolin | Filtration rate | % by wt solids in cake | Scattering coefft (S) | % reflectance to light of wavelength | |
|---|---|---|---|---|---|---|
| | | | | | 457 nm | 570 nm |
| Composite Pigment PC | 25:75 | 1.69 | 51.6 | 139 | 83.0 | 86.9 |
| Composite Pigment PD | 50:50 | 3.42 | 43.9 | 174 | 86.8 | 89.5 |
| Composite Pigment PE | 75:25 | 6.14 | 40.9 | 289 | 91.6 | 93.7 |
| Composite Pigment PF | 95:5 | 6.45 | 39.2 | 309 | 93.8 | 95.9 |
| Kaolin KB | — | 0.37 | 63.6 | 134 | 79.7 | 85.1 |

These results further show that the Composite Pigments PC to PF dewater more readily by filtration, have a higher light scattering ability, a higher powder brightness and a lower yellowness than the original kaolin, KB.

EXAMPLE 10

120.6 g of quicklime was slaked in 1077 ml of an aqueous suspension containing 5% by weight of a ball clay from South Devon, England (Ball Clay BA) comprising about 54% by weight kaolinite, about 30% by weight mica and about 15% by weight quartz and having a particle size distribution as follows:

| x | % by weight of particles finer than x |
|---|---|
| 5 μm | 96 |
| 2 μm | 88 |
| 1 μm | 81 |
| 0.5 μm | 72 |

The temperature of the suspension was adjusted to 50° C. before the introduction of the quicklime and the mixture was vigorously stirred for 25 minutes to ensure substantially complete slaking of the quicklime. The quantities of quicklime and of the 5% by weight suspension of ball clay were such that 2 gram moles (148 g) of calcium hydroxide were present per liter of the suspension. The volume of the suspension was then made up to 8000 ml by adding a further 6923 ml of the ball clay suspension.

A gas mixture comprising 16.7% by volume of carbon dioxide, the remainder being air, was then introduced into the suspension as a fine stream of bubbles at a rate of 0.027 moles of carbon dioxide per minute per mole of calcium hydroxide. The temperature of the suspension was adjusted to 35° C. and the gas mixture was introduced with continuous agitation of the suspension by means of a stirrer rotating at 500 rpm until the pH of the suspension had fallen to below 8.0.

Calcium carbonate was precipitated in crystalline form bonded upon and between the particles constituting the ball clay, and the resultant material was found to be a composite mixed mineral comprising ball clay particles and precipitated calcium carbonate. The theoretical amount of calcium carbonate which could be yielded by the original 120.6 g of quicklime was 215.4 g, and the total dry weight of ball clay in the suspension was 400 g. The weight ratio of calcium carbonate to ball clay was therefore assumed to be 35:65. This composite mixed mineral is identified below as Composite Pigment PG.

A second composite mixed mineral was prepared by the method described above, except that 224 g of quicklime were slaked in 2000 ml of the suspension containing 5% by weight of Ball Clay BA before the volume of the suspension was made up to 8000 ml by adding a further 6000 ml of the ball clay suspension. In this case the carbon dioxide-containing gas mixture was bubbled through the suspension at a rate of 0.021 moles of carbon dioxide per minute per mole of calcium hydroxide. The theoretical amount of calcium carbonate which could be yielded by the original 224 g of quicklime was 400 g, and the total weight of dry kaolin clay in the suspension was also 400 g. The weight ratio of calcium carbonate to kaolin was therefore assumed to be 50:50. The composite mixed mineral is identified below as Composite Pigment PH.

A third composite mixed mineral was prepared by the method described above, except that 672 g of quicklime were slaked in 6000 ml of the suspension containing 5% by weight of Ball Clay BA before the volume of the suspension was made up to 8000 ml by adding a further 2000 ml of the ball clay suspension. In this case the carbon dioxide-containing gas mixture was bubbled through the suspension at a rate of 0.0070 moles of carbon dioxide per minute per mole of calcium hydroxide. The theoretical amount of calcium carbonate which could be yielded by the original 672 g of quicklime was 1200 g, and the total weight of dry kaolin clay in the suspension was 400 g. The weight ratio of calcium carbonate to kaolin was therefore assumed to be 75:25. The composite mixed mineral is identified below as Composite Pigment PI.

Three further composite mixed minerals were prepared using the same proportions of ball clay and quicklime and the same method of preparation, except that, in the case of these three composite mixed minerals, the ball clay used in the preparation was a ball clay from Dorset, England (Ball Clay BB) comprising about 57% by weight kaolinite, about 33% by weight mica and about 8% by weight quartz and having the following particle size distribution:

| x | % by weight of particles finer than x |
|---|---|
| 5 $\mu$m | 99 |
| 2 $\mu$m | 94 |
| 1 $\mu$m | 87 |
| 0.5 $\mu$m | 74 |

These three composite mixed minerals are identified below as Composite Pigments PJ, PK and PL, respectively.

The filtration properties, the Kubelka-Munk scattering coefficient, S, and the powder brightness of each of the composite mixed minerals were measured by the procedures described in the earlier Examples.

As controls the above experiments were repeated using uncomposited Ball Clays BA and BB as the mineral pigments.

The results of the various measurements are set forth in Table 9 below.

TABLE 9

| Pigment | Wt Ratio $CaCO_3$: ball clay | Filtration rate | % by wt solids in cake | Scattering coefft (S) | % reflectance to light of wavelength | |
|---|---|---|---|---|---|---|
| | | | | | 457 nm | 570 nm |
| Composite Pigment PG | 35:65 | 0.09 | 53.4 | 177 | 74.9 | 80.4 |
| Composite Pigment PH | 50:50 | 0.44 | 44.7 | 231 | 78.0 | 82.5 |
| Composite Pigment PI | 75:25 | 0.96 | 49.4 | 217 | 81.3 | 85.7 |
| Ball Clay BA | — | 0.02 | | | 64.4 | 71.0 |
| Composite Pigment PJ | 35:65 | 0.12 | 63.6 | 124 | 69.9 | 75.8 |
| Composite Pigment PK | 50:50 | 0.44 | 42.1 | 136 | 70.3 | 75.3 |
| Composite Pigment PL | 75:25 | 0.84 | 42.4 | 257 | 81.5 | 86.7 |
| Ball Clay BB | — | 0.03 | 49.6 | 103 | 61.5 | 69.6 |

These results show that Composite Pigments PG to PL dewater more rapidly by filtration, have better light scattering properties, and a higher brightness and a lower yellowness than the original Ball Clays BA and BB onto which the calcium carbonate has been precipitated to form the Composite Pigments.

EXAMPLE 11

793 g of quicklime were slaked in 7040 ml of an aqueous suspension containing 5% by weight of a South Devon ball clay (Ball Clay BC) which comprises about 58% by weight kaolinite, about 28% by weight mica and about 13% by weight quartz and has the following particle size distribution:

| x | % by weight of particles finer than x |
|---|---|
| 5 $\mu$m | 94 |
| 2 $\mu$m | 86 |
| 1 $\mu$m | 75 |
| 0.5 $\mu$m | 66 |

The temperature of the suspension was adjusted to 50° C. before the introduction of the quicklime and the mixture was vigorously stirred for 25 minutes to ensure substantially complete slaking of the quicklime.

835 ml of the resultant suspension containing slaked lime and ball clay BC was then mixed with a further 5405 ml of the 5% by weight suspension of the ball clay BC and 1760 ml of water, and the lime in the mixed suspension was carbonated by passing through the suspension a gas mixture comprising 16.7% by volume of carbon dioxide, the remainder being air, as a fine stream of bubbles at a rate of 0.033 moles of carbon dioxide per minute per mole of calcium hydroxide. The temperature of the suspension was adjusted to 35° C. and the gas mixture was introduced with continuous agitation of the suspension by means of a stirrer rotating at 250 rpm until the pH of the suspension had fallen to below 8.0.

Calcium carbonate was precipitated in crystalline form bonded upon and between the particles constituting the ball clay BC, and the resultant material was found to be a composite mixed mineral comprising ball clay particles and precipitated calcium carbonate. The theoretical amount of calcium carbonate which could be yielded by the quicklime present in the volume of the slaked lime-containing suspension which was used was 168 g, and the total weight of dry ball clay in the suspension was 312 g. The weight ratio of calcium carbonate to ball clay was therefore assumed to be 35:65. This composite mixed mineral is identified below as Composite Pigment PM.

A second composite mixed mineral was prepared by the method described for Composite Pigment PM above, except that 1551 ml of the slaked lime-containing suspension was mixed with a further 4689 ml of the ball clay suspension and 1760 ml of water. In this case the carbon dioxide-containing gas mixture was bubbled through the suspension at a rate of 0.019 moles of carbon dioxide per minute per mole of calcium hydroxide. The theoretical amount of calcium carbonate which could be yielded by the quicklime present in the volume of the slaked lime-containing suspension which was used was 312 g, and the total dry weight of ball clay BC in the suspension was also 312 g. The weight ratio of calcium carbonate to ball clay was therefore assumed to be 50:50. This composite mixed mineral is identified below as Composite Pigment PN.

A third composite mixed mineral was prepared by the method described above, except that 4654 ml of the slaked lime-containing suspension was mixed with a further 1586 ml of the ball clay BC suspension and 1760 ml of water. In this case the carbon dioxide-containing gas mixture was bubbled through the suspension at a rate of 0.007 moles of carbon dioxide per minute per mole of calcium hydroxide. The theoretical amount of calcium carbonate which could be yielded by the quicklime present in the volume of the slaked lime-containing suspension which was used was 936 g, and the total weight of dry ball clay in the suspension was 312 g. The weight ratio of calcium carbonate to ball clay was therefore assumed to be 75:25. This composite mixed mineral is identified below as Composite Pigment PO.

The filtration properties, the Kubelka-Munk scattering coefficient, S, and the powder brightness of each of the Composite Pigments PM to PO mixed minerals were measured by the procedures described in the earlier Examples.

As a control, these experiments were repeated using Ball Clay BC uncomposited as the mineral pigment.

The results of the various measurements are set forth in Table 10 as follows.

TABLE 10

| Pigment | Wt Ratio CaCO$_3$: ball clay | Filtration rate | % by wt solids cake | Scattering coefft (S) | % reflectance to light of wavelength 457 nm | 570 nm |
|---|---|---|---|---|---|---|
| Composite Pigment PM | 35:65 | 0.11 | 52.3 | 112 | 69.6 | 74.6 |
| Composite Pigment PN | 50:50 | 0.52 | 45.5 | 135 | 72.4 | 77.0 |
| Composite Pigment PO | 75:25 | 1.78 | 47.3 | 235 | 82.6 | 86.9 |
| Ball Clay EC | — | | | | 66.0 | |

Improvements in the various measured properties as compared with Ball Clay BC are shown by the Composite Pigments PM to PO.

EXAMPLE 12

Composite Pigment PO was used as a filler in paper making. Hand sheets of paper filled with the aggregated mixed pigment were prepared in the following way. In the preparation of each batch of paper making stock, 2 liters of a suspension containing 3.5% by weight of dry pulp comprising 60% by weight of thermomechanical pulp and 40% by weight of recycled fibre was diluted to 10 liters with filtered water and was then disintegrated for 10 minutes in a turbine mixer, the impeller rotating at a speed of 1500 rpm. At this stage the stock contained approximately 0.7% by weight of dry pulp and the Canadian Standard Freeness was 130. The volume of stock was made up to 20 liters with filtered water and the consistency was checked by forming a paper sheet from a small sample by draining on a suitable wire screen and drying and weighing the sheet thus formed. Water was added if necessary to reduce the consistency (dry solids content) to 0.3% by weight of the aqueous pulp suspension.

There were then added to the batches of paper making stock thus formed and stirred in by hand sufficient of an aqueous suspension of the aggregated crystalline precipitate to provide amounts of 3%, 6% and 10%, respectively, by dry weight of the total solid material in the paper making stock. This was followed in each case by the addition of 0.04% by weight, based on the total weight of dry solid material in the stock, of a cationic polymer retention aid.

Hand sheets were prepared from the batches of filler-containing paper making stock according to the procedure laid down in TAPPI Standard No T205 om-88, "Forming handsheets for physical tests of pulp". For each hand sheet a sample of the stock was poured into the sheet forming machine and surplus water was removed. Each handsheet was calendered before testing by being passed 3 times through the nip of a laboratory calender the rolls of which were turning at a peripheral speed of 25 m.min$^{-1}$ at a temperature of 23° C. and a line pressure of 16.7 kN.m$^{-1}$.

The brightness, or percentage reflectance to violet light, of the calendered hand sheets and the opacity of each sample of paper were measured by the methods described in earlier Examples.

The calendered hand sheets from each batch were also tested for bursting strength by the test prescribed in TAPPI Standard No T403 om-85. The bursting strength is defined by the hydrostatic pressure in kilopascals required to produce rupture of the material when the pressure is increased at a controlled constant rate through a rubber diaphragm to a circular area of the paper 30.5 mm in diameter. The area of the material under test is initially flat and held rigidly at the circumference but is free to bulge during the test. Samples of each sheet were also weighed dry, the weight of the dry sample being used to determine the weight per unit area of the paper in grams per square meter. The burst strengths were divided by the weight per unit area of the paper to give a burst ratio.

The filler content of each batch was determined by incinerating a sample of the handsheets prepared from that batch. The weight of the ash residue was determined and expressed as a percentage of the total weight of the sample of handsheets. From this percentage, and from a knowledge of the weight ratio of inorganic to organic material in the solid component of the original froth product, the percentage by weight of filler in the handsheets was determined. For each batch, each of the measured properties was plotted graphically against the percentage by weight of filler, and the value of the property which corresponded to a filler content of 5% by weight was determined by interpolation.

As a comparison, calendered hand sheets were prepared from paper making stock which contained a conventional filler used in paper making, which filler was a calcined US kaolin clay (Calcined Clay CA) consisting of very fine kaolinite platelets aggregated together, and having a particle size distribution such that 90% by weight consisted of particles having an equivalent spherical diameter smaller than 2 μm. As a further comparison, calendered hand sheets were prepared from paper making stock which contained no filler. These two comparative sets of handsheets were subjected to the same tests as are described above.

The results are set forth in Table 11 below. For the hand sheets prepared from stock containing filler, the burst ratio was expressed as a percentage of the value obtained for the unfilled hand sheets.

TABLE 11

| Filler | Brightness (%) | Opacity (%) | Burst ratio (% of value for unfilled sheet) |
|---|---|---|---|
| Unfilled | 58.0 | 93.5 | 100 |
| Calcined Clay CA | 61.5 | 94.6 | 80 |
| Composite Pigment PO | 59.0 | 94.6 | 91 |

These results show that the opacity of the paper containing the Composite Pigment PO as filler is the same as that of the paper containing the conventional filler CA, although the brightness of the paper containing the mineral as filler is slightly lower. However, the paper containing the Composite Pigment PO as filler is found to have a higher strength than the paper containing the conventional filler, CA.

I claim:

1. A process for aggregating an aqueous suspension of particulate kaolin clay comprising the steps of:
   (a) providing an aqueous suspension of particulate kaolin clay; and
   (b) introducing into the aqueous suspension a first reagent comprising a source of alkaline earth metal ions and a second reagent comprising a source of carbonate ions to precipitate an alkaline earth metal carbonate in said aqueous suspension whereby the particulate kaolin clay present in the aqueous suspension prior to the introduction of the first and second reagents becomes entrained by the alkaline earth metal carbonate to form an aggregated particulate material.

2. A process according to claim 1, wherein the weight ratio of particles originally present in the aqueous suspension in step (a) to precipitate produced in step (b) is in the range of from 0.7:75 to about 16.2:10.

3. A process according to claim 1, wherein the solids content of the aqueous suspension in step (a) is less than about 10% by weight.

4. A process according to claim 1, wherein the kaolin present in the aqueous suspension in step (a) contains particles having an average particle diameter smaller than 1 μm.

5. A process according to claim 4, wherein the kaolin present in the aqueous suspension in step (a) contains particles having an average particle diameter smaller than 0.5 μm.

6. A process according to claim 1, wherein the aggregated particulate material is recovered and incorporated in a composition which is a paper making composition or a paper coating composition or a paint composition or a plastics composition.

7. A process as claimed in claim 6 and wherein the aggregated particulate material is incorporated in a paper making or paper coating composition.

8. A process as claimed in claim 7 and wherein the aggregated particulate material is incorporated in the composition for paper making or paper coating in the form of an aqueous suspension.

9. A process as claimed in claim 8 and wherein the aqueous suspension containing said aggregated crystalline material is added directly in relatively dilute form to a paper making composition to provide filler particles for the composition.

10. A process according to claim 6, wherein the aqueous suspension containing the aggregated particulate material is dewatered.

11. A process according to claim 1 wherein the suspension of particulate kaolin clay additionally comprises a reducing bleaching agent.

12. A process according to claim 11, wherein the reducing bleaching agent comprises sodium dithionite.

13. A process according to claim 1 wherein the first reagent is introduced into the aqueous suspension followed by the second reagent.

14. A process according to claim 1 wherein the first reagent comprises a source of calcium ions whereby a precipitate of calcium carbonate is formed in step (b).

15. A process according to claim 1 wherein the source of alkaline earth metal ions is selected from the hydroxide of the alkaline earth metal and water-soluble salts of the alkaline earth metal.

16. A process according to claim 15, wherein the source of alkaline earth metal ions comprises an alkaline earth metal salt selected from alkaline earth metal chlorides and alkaline earth metal nitrates.

17. A process according to claim 1 wherein the first reagent comprises an alkaline earth metal oxide which converts to the corresponding alkaline earth metal hydroxide in the aqueous suspension.

18. A process according to claim 17 wherein the source of the alkaline earth metal ions comprises calcium oxide.

19. A process according to claim 18 wherein the source of carbonate ions comprises carbon dioxide.

20. A process according to claim 1 wherein the quantity of the source of alkaline earth metal ions and the source of carbonate ions used is such as to precipitate sufficient alkaline earth metal carbonate to increase the solids content of the aqueous suspension by an amount within the range from 10% to 20% by weight.

* * * * *